(12) United States Patent
Kai et al.

(10) Patent No.: US 6,349,364 B1
(45) Date of Patent: Feb. 19, 2002

(54) CACHE MEMORY SYSTEM WITH VARIABLE BLOCK-SIZE MECHANISM

(75) Inventors: Koji Kai, Fukuoka; Koji Inoue, Chikushino; Kazuaki Murakami, Kasuga, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/270,254

(22) Filed: Mar. 15, 1999

(30) Foreign Application Priority Data

Mar. 20, 1998 (JP) .......................................... 10-072661
Mar. 20, 1998 (JP) .......................................... 10-072665

(51) Int. Cl.$^7$ .......................... G06F 12/04; G06F 13/00
(52) U.S. Cl. ....................... 711/133; 711/171; 711/172; 711/129
(58) Field of Search ................................ 711/170, 171, 711/118, 3, 129, 113, 172, 133; 709/104

(56) References Cited

U.S. PATENT DOCUMENTS 4,315,312 A * 2/1982 Schmidt ...................... 711/172
4,503,501 A * 3/1985 Coulson et al. .............. 711/129
4,994,962 A * 2/1991 Mageau et al. ................. 711/3
5,555,391 A * 9/1996 Subijana et al. ............. 711/113

* cited by examiner

Primary Examiner—Matthew Kim
Assistant Examiner—B. Peugh
(74) Attorney, Agent, or Firm—Jordan and Hamburg LLP

(57) ABSTRACT

The present invention provides for setting the block-size suitably in each address space in order to deal with the difference of the scope within the spatial locality in the address space, and to suppress the generating of the unnecessary replacing. In a cache memory system according to the present invention, a cache memory is provided for temporarily storing the data stored in a main memory, and a processor accesses the cache memory, the cache memory system comprising: a block-size information storing system for storing the size of the data to be replaced between the cache memory and the main memory in every plural storage spaces of predetermined amount within the cache memory; and a system for replacing the data between the storage space in which the cache miss is occurred within the cache memory and the main memory, when the access of the processor to the storage space within the cache memory produces a cache miss, at the block-size corresponding to the storage space producing the cache miss, among the size stored in the block-size information storing system.

4 Claims, 11 Drawing Sheets

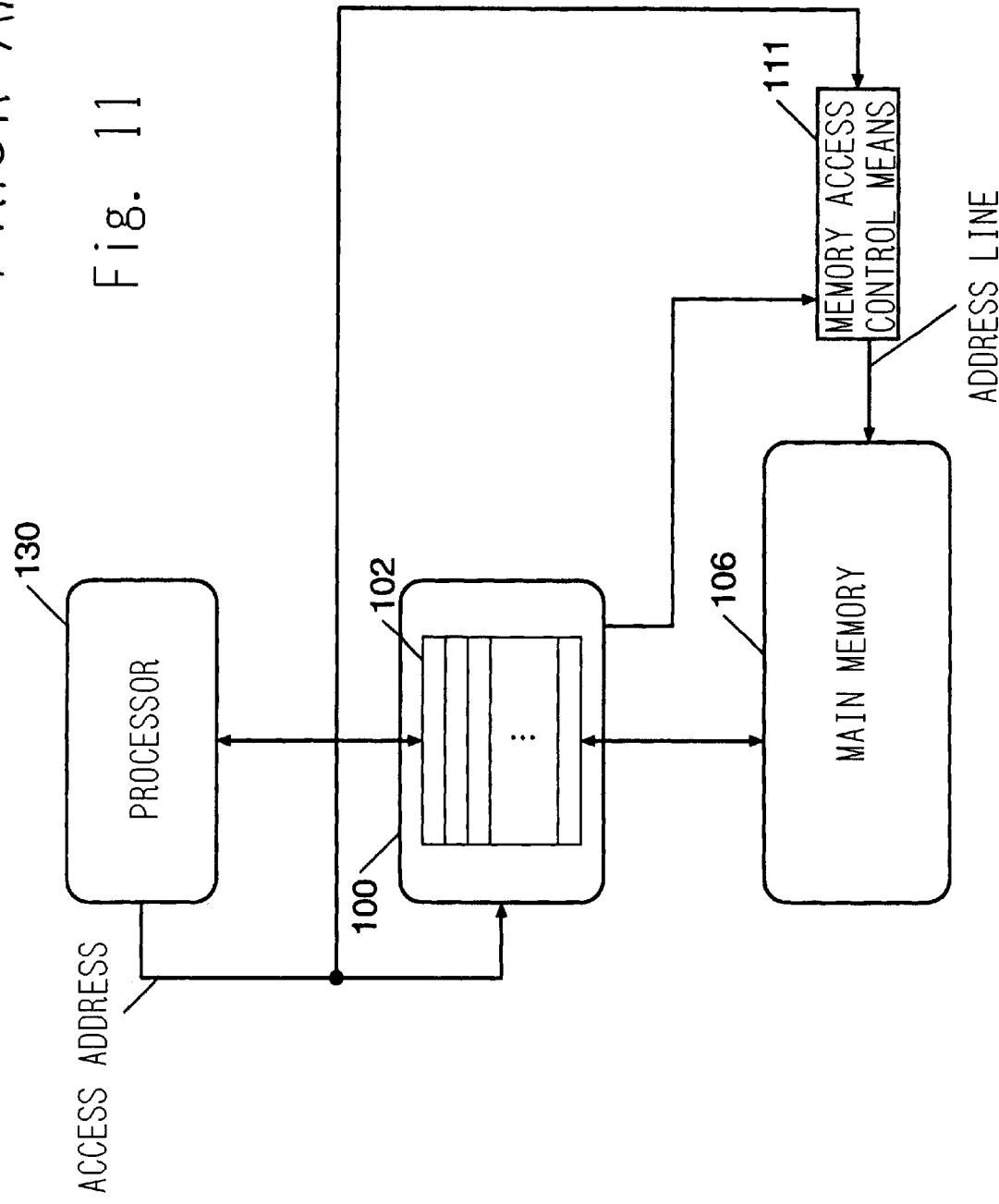

CACHE MEMORY SYSTEM WITH VARIABLE BLOCK-SIZE MECHANISM

BACKGROUND OF THE INVENTION

1. Field of the Invention

The present invention relates to a semiconductor circuit having a cache memory, more specifically to a cache memory system for reducing times of replacing data between a cache memory and a main memory.

2. Prior Art

A cache memory system in the prior art is constituted as shown in FIG. 11.

A cache memory 100 is provided with a data array 102 storing the data, and is connected to a processor 130 and a main memory 106. Size of the data transferring between the data array 102 and the main memory 106 is determined at the design state, and according to this size, a memory access control means 111 transfers the data between the data array 102 and the main memory 106. Thus in the cache memory system in the prior art, the size of the data transferring between the main memory 106 and the cache memory 100 is fixed to any amount.

Operation of replacing the data between the main memory and the cache memory hereinafter is called replacing, and the size of the replaced data is called block-size.

If the block-size is fixed to any value, depending on characteristics of behavior of a program, times of replacing may be increased in two cases.

In one case, in comparison with amount of the data to be transferred from the main memory 106 to the cache memory 100, block-size which can be replaced in transfer of one time is small.

Then, times of transferring the data required by the processor from the main memory 106 to the cache memory 100 and times of transferring the data bit required by the processor from the cache memory 100 to the main memory 106 are increased.

Operation of transferring the data from the main memory to the cache memory is hereinafter called replacing-in, and operation of transferring the data from the cache memory to the main memory is called replacing-out.

In another case, in comparison with amount of the data to be transferred from the main memory 106 to the cache memory 100, block-size which can be replaced in transfer of one time is large. Then the data to be originally stored within the cache memory 100 may be replaced out together with the data to be replaced out from the cache memory 100 to the main memory 106.

Therefore regarding the data which are replaced out although to be originally stored within the cache memory 100, when the processor is going to refer the data, the data must be replaced in again.

In order to solve these problems, cache memories having constitution as disclosed in JP-A 62-118456 or JP-A 63-157249 have been proposed.

In any of cache memories, block-size is set to one predetermined value by instruction or the like, during initialization or during execution of program.

Thereby dealing with the difference of the scope within the spatial locality different in each program or the variation of the scope within the spatial locality during the execution of one program, the block-size can be varied.

In the computer system in the prior art, however, since a processor and a cache memory are separate LSIs, because of pin constraint of the LSI, width of a data bus between the processor and the cache memory can not be designed wide, and the block-size is designed large in comparison with the data bus width.

Since the block-size is designed large in comparison with the data bus width, there is a problem that the clock cycle number required for the data transfer is increased.

In order to solve these problems, a clock memory with variable line size has been proposed (Technical Report of the Information Processing Society of Japan, Architecture Research Group, ARC-119-28, August 1996).

This cache memory is based on that a processor, a cache memory and a DRAM being a main memory are merged on one LSI. Since the cache memory and the main memory are directly connected within the LSI, the cache memory is characterized in that the width of the data bus connecting between the cache memory and the main memory can be designed wide. Further the block-size can be set to one value predetermined as mode of the whole cache.

Therefore in a region where the block-size is small in comparison with the data bus width, the block-size can be set not increasing the cycle required for the data transfer.

In general, a cache memory is a storage device which utilizes property that the data once accessed can be accessed again within the near time at high possibility (time locality) and property that data in the vicinity of the accessed data can be soon accessed with high possibility (spatial locality), and stores the data to be referred by the processor in the near future with high possibility.

Noticing the spatial locality particularly, not only the scope within the spatial locality is different in each program, but also even in single program, the scope within the spatial locality is different depending on the address space.

This is clear considering an example that individual elements in two arrangements different in amount stored in address spaces separated from each other within certain time are accessed in the same times respectively. That is, comparing a wide address space storing a large arrangement and a narrow address space storing a small arrangement, it can be said that the former is high in the spatial locality.

However, since any of proposed architectures as above described, determines the block-size as mode of the whole cache uniquely, it is difficult to deal with the difference of the scope within the spatial locality in the address space.

If the set block-size is not suitable, the unnecessary replacing may be caused as above described.

SUMMARY OF THE INVENTION

Therefore the first problem to be solved by the present invention is to provide means for setting the block-size suitably in each address space in order to deal with the difference of the scope within the spatial locality in the address space, and to suppress the generating of the unnecessary replacing.

Further as the execution of the program advances, the referring frequency of the processor to the same address space varies.

As an example in this case, some data are frequently referred at some time, but are accessed rarely (or more frequently) as the execution of the program advances.

Therefore the second problem to be solved by the invention is, in order to deal with the difference of the scope within the spatial locality attendant on the execution of the program, in addition to the dealing with the first problem, to provide means for updating the block-size in each address space during the execution of the program thereby to suppress the generating of the unnecessary replacing.

In order to solve the first problem, in a cache memory system according to the present invention, a cache memory is provided for temporarily storing the data stored in a main memory, and a processor accesses the cache memory. The cache memory system is provided with a block-size information storing means for storing size of the data to be replaced between the cache memory and the main memory in every plural storage spaces of predetermined amount within the cache memory, and with means for replacing the data between the storage space in which a cache miss is occurred within the cache memory and the main memory, when the access of the processor to the storage space within the cache memory occurs a cache miss, at the block-size corresponding to the storage space in which the cache miss is occurred, among the size stored in the block-size information storing means.

In the cache memory system, access address outputted by the processor is provided with individual fields of tag address, index address, bank address and an offset within the bank, and the cache memory comprises at least two cache banks, and each cache bank as above described has a data array constituted by aggregate of elements storing the data in the word number assigned by the offset within the bank, a valid flag array constituted by aggregate of valid flags storing whether or not the data stored in the individual elements of the data array are valid, and a tag array storing the individual tag addresses of the data stored in the individual elements of the data arrays. The data array, the valid flag array and the tag array respectively output the data of the elements assigned by the index address, values of the valid flags of the data, and the tag addresses of the data. Further each cache bank as above described is provided with a comparator for comparing the tag address outputted by the tag array and the tag address within the access address and indicating the comparison result, when the value of the valid flag indicates the storing of the data valid to the element, with a first multiplexer for selecting and outputting the comparison result of the comparator of the cache bank assigned by the bank address, with the block-size information storing means for referring the size in each storage space within the cache memory at the index address, and with a memory access control circuit performing control of replacing the data between the cache memory and the main memory. When the processor outputs the access address, the memory access control circuit judges whether or not the cache miss is occurred by the output of the first multiplexer, and when the cache miss occurs, the memory access control circuit replaces the data between the storage space in which the cache miss is occurred and the main memory space assigned by the access address, at the block-size corresponding to the storage space in which the cache miss is occurred, among the size stored in the block-size information storing means.

In a cache memory system to solve the second problem, access address outputted by the processor is provided with individual fields of tag address, index address, bank address and an offset within the bank, and the cache memory comprises at least two cache banks, and each cache bank as above described has a data array constituted by aggregate of elements storing the data in the word number assigned by the offset within the bank, a valid flag array constituted by aggregate of valid flags storing whether or not the data stored in the individual elements of the data array are valid, a tag array storing the individual tag addresses of the data stored in the individual elements of the data array, and an access bit array constituted by aggregate of access bits storing whether or not the individual data stored in the individual elements of the data array are referred by the processor, after the data are read in the elements respectively until now. The data array, the valid flag array, the tag array and the access bit array respectively output the data of the elements assigned by the index address, values of the valid flags of the data, the tag addresses of the data, and values of the access bits of the data. Further each cache bank as above described is provided with a comparator for comparing the tag address outputted by the tag array and the tag address within the access address and outputting the comparison result, when the value of the valid flag indicates the storing of the data valid to the element, with a first multiplexer for selecting and outputting the comparison result of the comparator of the cache bank assigned by the bank address, with the block-size information storing means for outputting the size in each storage space within the cache memory assigned by the index address, with a line utility condition judging circuit for outputting a signal indicating the cache bank, if the comparison results outputted by the comparators of all cache banks and the values outputted by the access bits of all cache banks are inputted, when the comparison results are coincident and results are coincident and values of the outputted access bits indicate the referring by the processor, with a block-size determination circuit for determining the new size of the storage space, if the size of the storage space within the cache memory assigned by the index address, the bank address and the output of the line utility condition judging circuit are inputted, and with a memory access control circuit performing control of replacing the data between the cache memory and the main memory. When the processor outputs the access address, the memory access control circuit judges whether or not the cache miss is occurred by the output of the first multiplexer, and when the cache miss is occurred, the memory access control circuit replaces the data between the storage space in which the cache miss is occurred and the main memory space assigned by the access address, at the block-size corresponding to the storage in which the cache miss is occurred, among the size stored in the block-size information storing means, and the block-size determination circuit updates the size stored in the block-size information storing means.

The block-size information storing means has a second multiplexer for storing the size in each element within the cache memory and selecting and outputting the size of the cache bank assigned by the bank address, and when the cache miss is occurred, the memory access control circuit replaces the data between the space in which the cache miss is occurred and the main memory assigned by the access address, at the size outputted by the second multiplexer.

The block-size information storing means is provided with a second tag array storing the tag address of the data returned to the main memory and a table storing the size, and when the second tag array and the table are referred in the index address, the size and the tag address are outputted. A second comparator is provided for comparing the tag address outputted by the table and the tag address within the access address and outputting the comparison result, and a tag selection circuit is provided for selecting the tag address to be inputted to the table from outputs of the tag arrays of all cache banks by the bank address. When the cache miss is occurred, if the comparison result of the tag address of the access address by the second comparator and the tag address outputted by the second array are coincident, the data returned to the main memory are read into the cache memory again, at the size stored in the table assigned by the index address. The tag address selected in the tag selection circuit and the size assigned by the index address in which the cache miss is occurred and corresponding to the storage space within the cache memory are stored respectively in the second tag array and the table.

BRIEF DESCRIPTION OF THE DRAWINGS

FIG. 11 is a block diagram showing an embodiment of a cache memory in the prior art.

DESCRIPTION OF THE PREFERRED EMBODIMENTS

Embodiments of a cache memory system with variable block-size mechanism according to the present invention will be described referring to FIGS. 1 to 10 as follows.

First Embodiment

Figure 1:
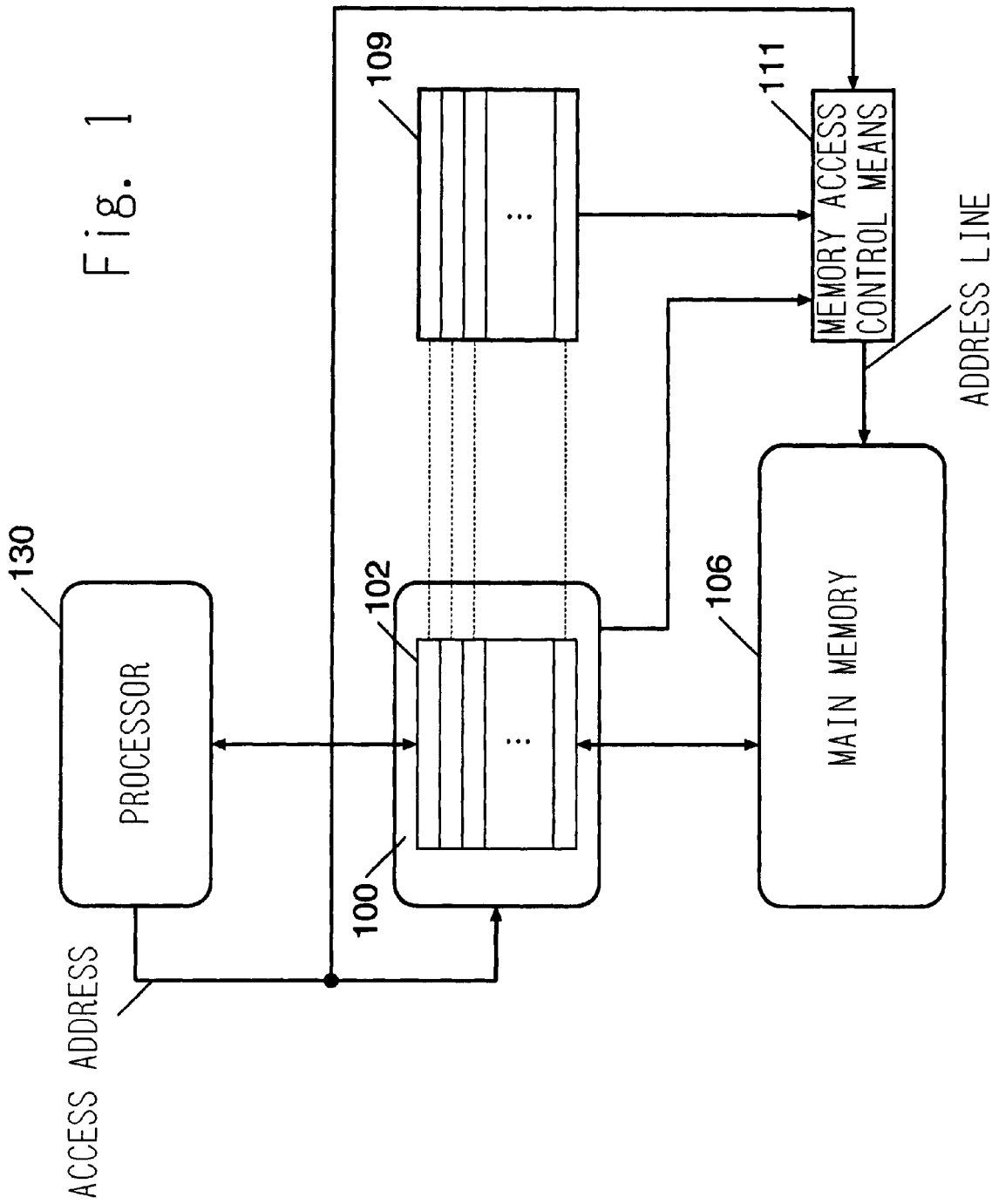
FIG. 1 is a block diagram of a first embodiment of the invention showing concept of a cache memory with variable block-size mechanism.

FIG. 1 is a block diagram of a first embodiment of the present invention showing a cache memory with variable block-size mechanism, and a main memory and a processor to be connected to the cache memory.

In the first embodiment, a cache memory system is constituted by a cache memory 100, a memory access control means 111 and a block-size information storing unit 109.

The block-size information storing unit 109 stores block-size of a data array 102 within the cache memory 100 in a plurality of storage spaces divided in a unit of predetermined size.

Further the cache memory 100 connects a processor 130 and a main memory 106.

The processor 130 refers the cache memory 100 by access address.

When the referring of the cache memory 100 by the processor 130 raises a cache miss, the memory access control means 111 reads out block-size of data replaced from the block-size information storing unit 109 by the access address and replaces the data between the cache memory 100 and the main memory 106.

When the cache memory 100 is in direct map system, individual data being different in tag address within the main memory 106 and equal in index address are stored exclusively from each other in any storage space within the cache memory 100. Consequently as shown in the first embodiment, the block-size information storing unit 109 stores the block-size in any storage space within the memory thereby the block-size can be set dealing with the difference of the scope within the spatial locality in the address space.

Also when the cache memory 100 is in set associative system, the block-size storing means 109 stores the block-size in any storage space within the cache memory thereby the block-size can be set dealing with difference of the scope within the spatial locality in the address space.

Second Embodiment

Figure 2:
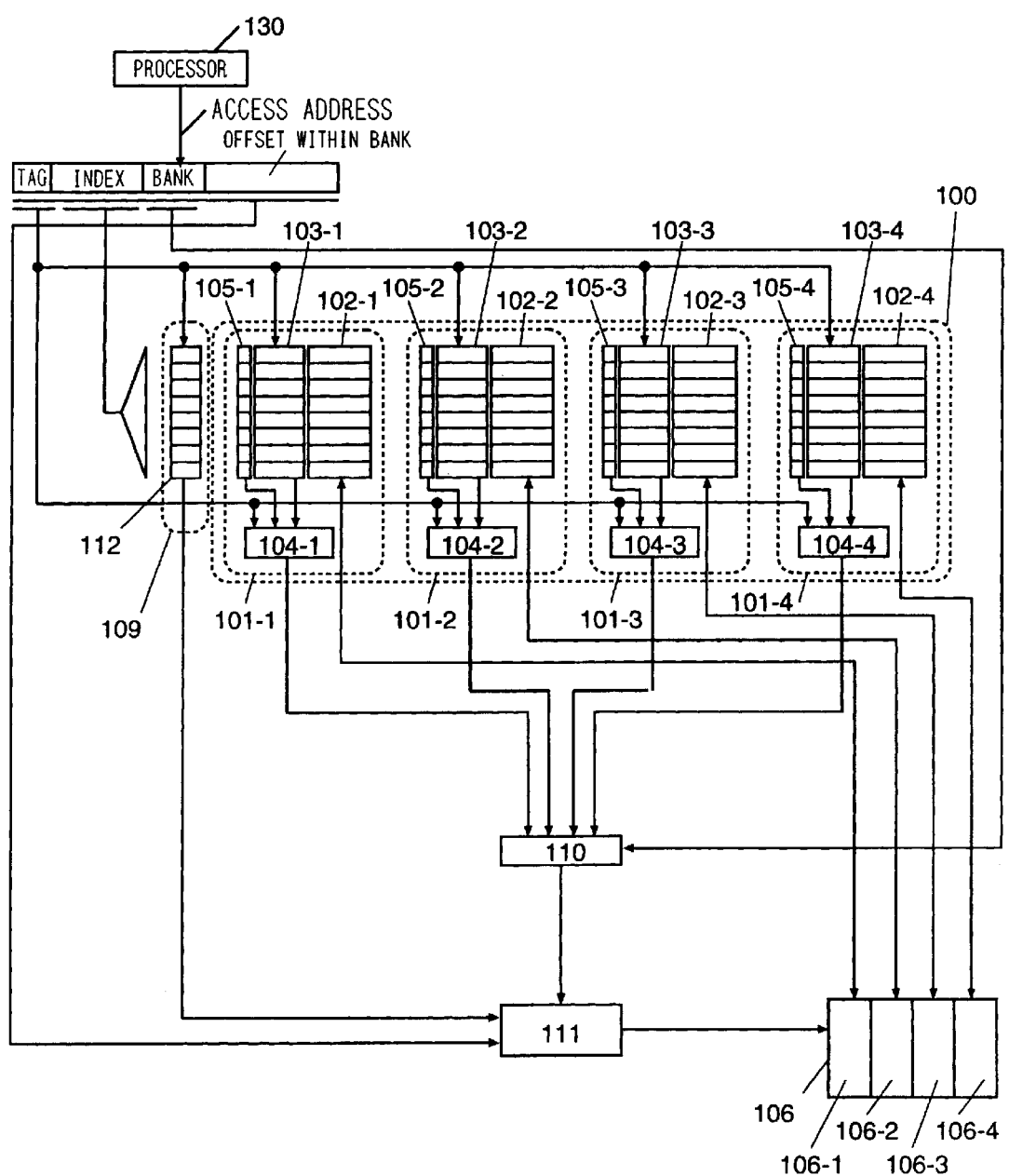
FIG. 2 is a block diagram of a second embodiment of the invention showing a cache memory with variable block-size mechanism where block-size is set in each cache line.

In a second embodiment shown in FIG. 2, a cache memory 100 is referred by access address outputted by a processor 130. The access address is provided with individual fields of tag address, index address, bank address and offset within the bank.

Also the cache memory 100 is constituted by a plurality of cache banks 101-1~101-4 comprising data arrays 102-1~102-4, valid flag arrays 105-1~105-4, tag arrays 103-1~103-4 and comparators 104-1~104-4.

The data arrays 102-1~102-4 store the data in unit of the word number assigned by the offset within the banks.

The valid flag arrays 105-1~105-4 store whether individual data stored in the data arrays 102-1~102-4 respectively are valid or not.

The tag arrays 103-1~103-4 store respective tag addresses of individual data stored in the data arrays 102-1~102-4.

The data arrays 102-1~102-4, the valid flag arrays 105-1~105-4 and the tag arrays 103-1~103-4 are assigned by index addresses, and when these arrays are accessed from the processor, values stored by the respective arrays are outputted.

A comparator of a cache bank assigned in a bank address, compares a tag address outputted by a tag array with a tag address in an access address when an output value of a valid flag array of the cache bank is valid.

Further when a tag address outputted by a tag array is coincident to a tag address in an access address, the comparator outputs a signal indicating cache hit, and when both addresses are not coincident or a value of the valid array of the cache bank assigned by the bank address is invalid, the comparator outputs a signal indicating cache miss hit.

A multiplexer 110 selects output values of the comparator assigned by the bank address and outputs the selected value.

A memory access control circuit 111 judges whether or not a cache miss occurs depending on an output value of the multiplexer 110. When a cache miss occurs, the memory access control circuit 111 replaces the data between the cache memory 100 and a main memory 106 according to block-size stored in a block-size information storing unit 109.

When a cache hit occurs, the memory control circuit 111 does not perform replacing.

In an example showing the second embodiment, the main memory 106 is constituted by four memory banks 106-1~106-4, and the individual cache banks 101-1~101-4 and the individual memory banks 106-1~106-4 are connected respectively.

Figure 3:
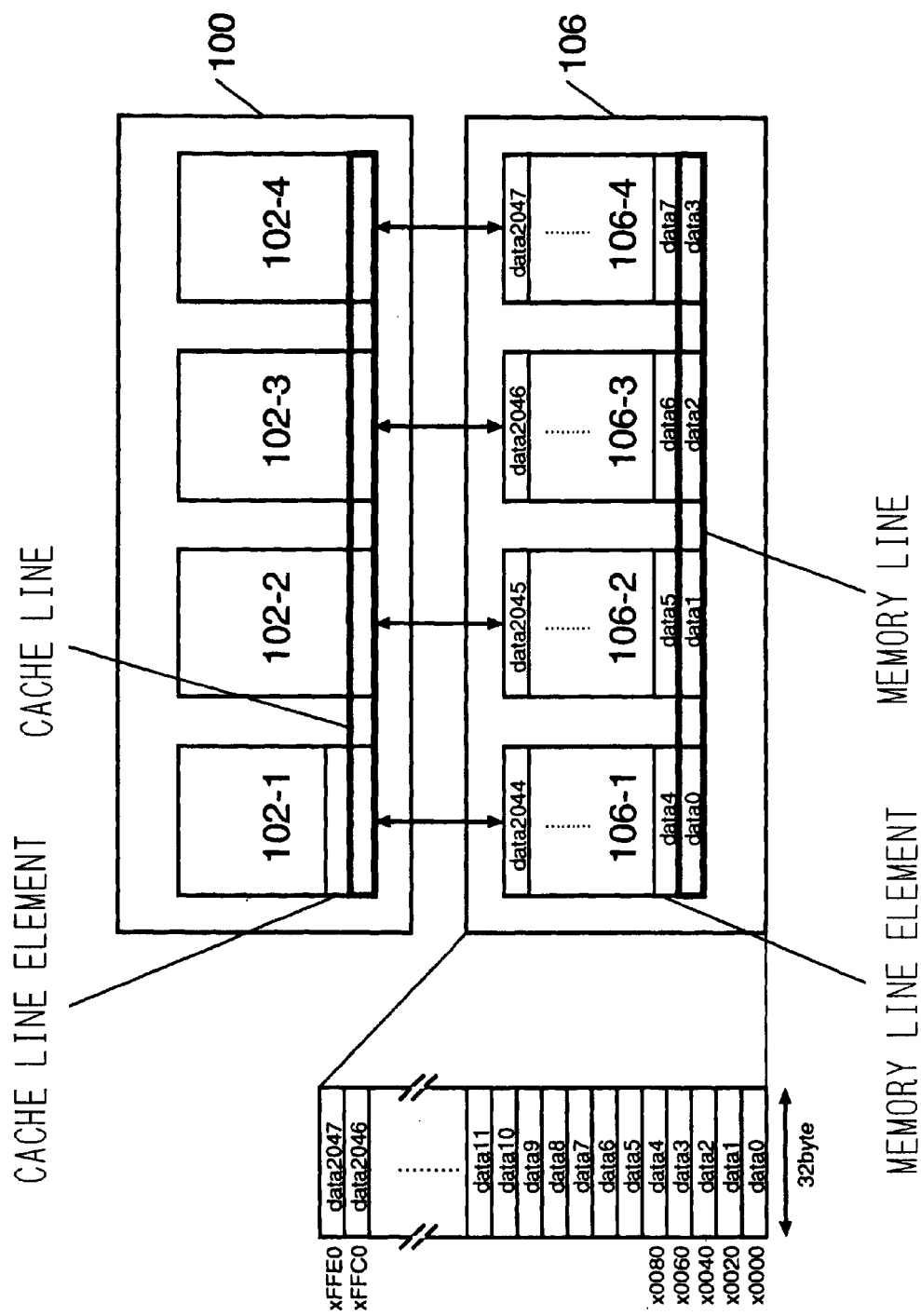
FIG. 3 is a block diagram showing addressing in the invention.

FIG. 3 shows connection between the data arrays 102-1~102-4 within the cache memory 100 and the main memory 106 in the second embodiment.

In this example, each of the cache memory 100 and the main memory 106 is constituted by four banks. The data array is assigned by the bank address. The individual data arrays are aggregate of storage elements called cache line elements, and referring to the data within the cache line elements is performed using offset within the bank. A cache line is defined as aggregate of cache line elements whose index addresses are common, FIG. 3 shows an example where the individual cache line elements store the data of 32 bytes.

On the other hand, the individual memory banks 106-1~106-4 are aggregate of storage elements called memory line elements.

Aggregate of memory lines referred by the tag address and the index address in the same access address is called a memory line. FIG. 3 shows an example of addressing where the bank address at the most left side in the same memory line becomes the lowest order.

Since the block-size and the size of the cache line are not always coincident, in any cache line, the data on the same memory line may be stored or otherwise the data on different memory lines may be stored.

In the second embodiment, an example will be described where the block-size information storing unit 109 has a block-size information table 112 first storing a block-size in each cache line.

When a cache miss occurs, replacing is executed in the block-size stored in the block-size information table 112. In the block-size information table 112, the block-size previously estimated before executing the program is stored. The block-size of any amount can be set in each cache line. In the second embodiment, an example will be described where there are three different block-sizes, large size (amount of the whole cache line), intermediate size (corresponding to two cache line elements continuing from the bank address in even number within the same cache line) and small size (corresponding to one cache line element).

When the block-size is set large to a field corresponding to any cache line of the block-size information table 112, if the access to any cache line element within the cache line of the processor raises a cache miss, the whole cache line becomes an object of replacing.

When the block-size is set intermediate, a cache line element being an object of replacing is different depending on the bank address of the access raising a cache miss.

In an example of the second embodiment where the cache bank is partitioned in four, there are two cases.

In one case, the access to the cache bank 101-1~101-2 raises a cache miss. Then the cache line elements of the cache banks 101-1 and 101-2 become an object of replacing.

In another case, the access to the cache bank 101-3 or 101-4 raises a cache miss. Then the cache line elements of the cache banks 101-3 and 101-4 become an object of replacing.

Finally, when the block-size is set small, only the cache line element raising a cache miss becomes an object of replacing. Since a system of setting the block-size in each cache line is adopted in such manner, the block-size corresponding to the difference of the scope within the spatial locality in the address space can be set easily and also the producing of unnecessary replacing can be prevented.

In the description of the second embodiment, although a specific example is mentioned, the embodiment is not limited to this but following examples may be used.

(1) In addition to a case that the above-mentioned cache memory system adopts direct map system, also in a case of adopting set associative system, block-size set to each field of the block-size information table 112 is commonly used between ways thereby a cache memory system with variable block-size mechanism of data can be realized.

(2) In addition to an example where the word length of the cache line element is 32 bytes as above described, the word length to be allocated to an offset within the bank is varied even in the case of different size thereby a cache memory system with variable block-size mechanism of data in the present invention can be realized.

(3) In addition to an example where the cache memory is constituted by four banks as above described, the word length to be allocated to the bank address is varied even in case of the bank number being different thereby a cache memory system with variable block-size of data in the present invention can be realized.

(4) In addition to the case that sort of the block-size is three as above described, also in the case that sort of the block-size is other than three, the combination of the cache line elements being an object of replacing is changed, and further in the case that sort of the block-size is three, the combination of the cache line elements being an object of replacing is changed, thereby a cache memory system with variable block-size of data in the present invention can be realized.

(5) In addition to an example where the individual data banks of the cache memory 100 are connected to the individual memory banks of the main memory 106 directly by the data bus respectively as above described, also in the case that width of the data bus connecting between the cache memory 100 and the main memory 106 is narrower than that of the above-mentioned example, a multiplexer and a demultiplexer are installed at an interface of the data bus thereby a cache memory system with variable block-size of data in the present invention can be realized.

(6) In addition to an example where the bank number is equal in the main memory and the cache memory as above described, even if the bank number is different from each other, the data line is multiplexed or demultiplexed thereby a cache memory system with variable block-size of data in the present invention can be realized.

Figure 4:
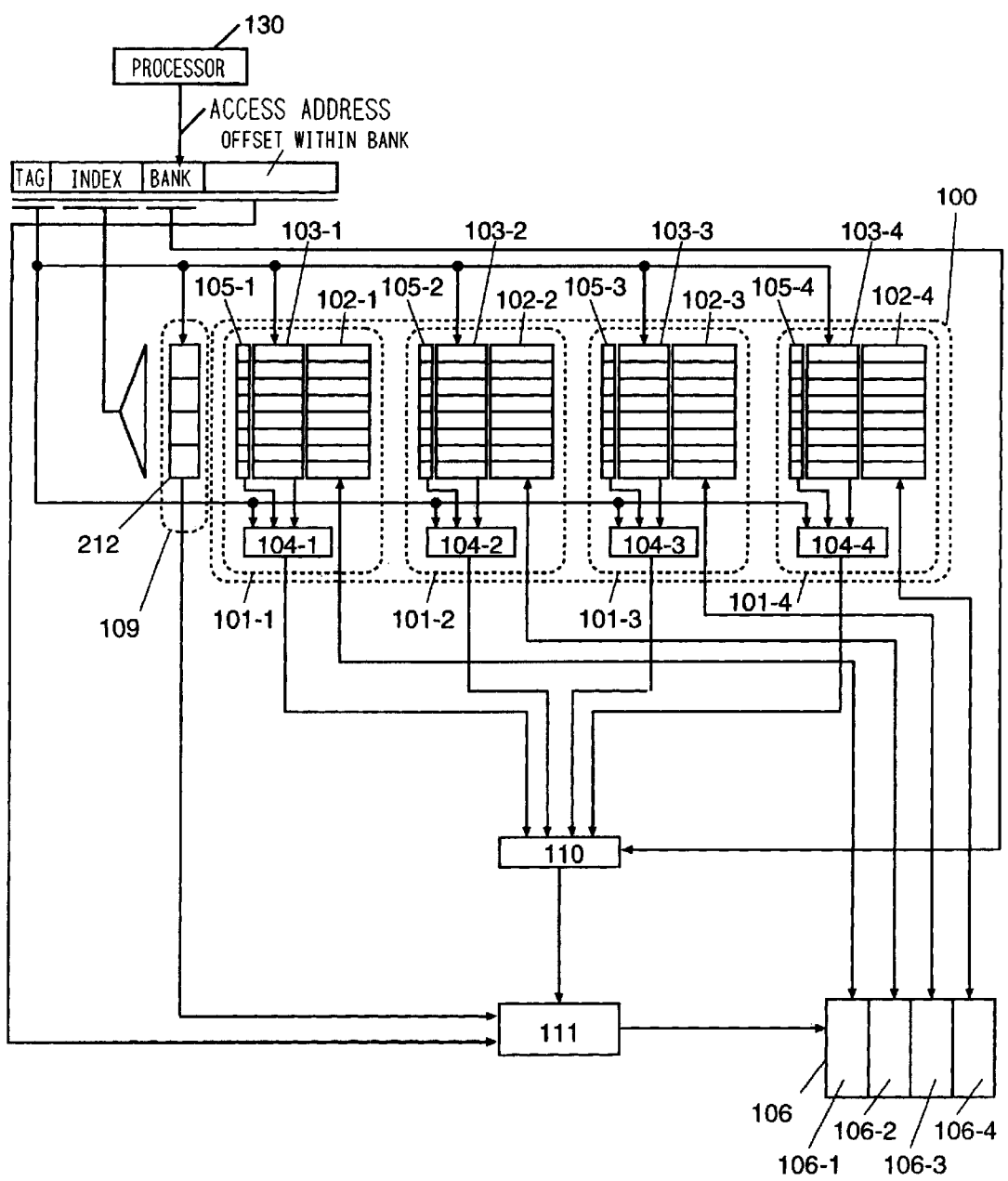
FIG. 4 is a block diagram of a cache memory with variable block-size mechanism in the invention showing a modification that block-size is set in every plural cache lines based on the second embodiment.

(7) In addition to the case that the block-size information storing unit 109 has the block-size information table 112 storing the block-size in each cache line as above described, even when the common block-size is set in every plural cache lines of any number, a cache memory system with variable block-size of data in the present invention can be realized. FIG. 4 shows an example where a block-size information table 212 has the block-size commonly in every two cache lines. When the block-size is used commonly between cache lines in such manner, since the granularity of setting becomes large, the difference of the scope within the spatial locality in the address space can not be dealt with finely, but since the capacity of the block-size information table may be small, there is effect that the hardware quantity can be reduced.

Third Embodiment

Figure 5:
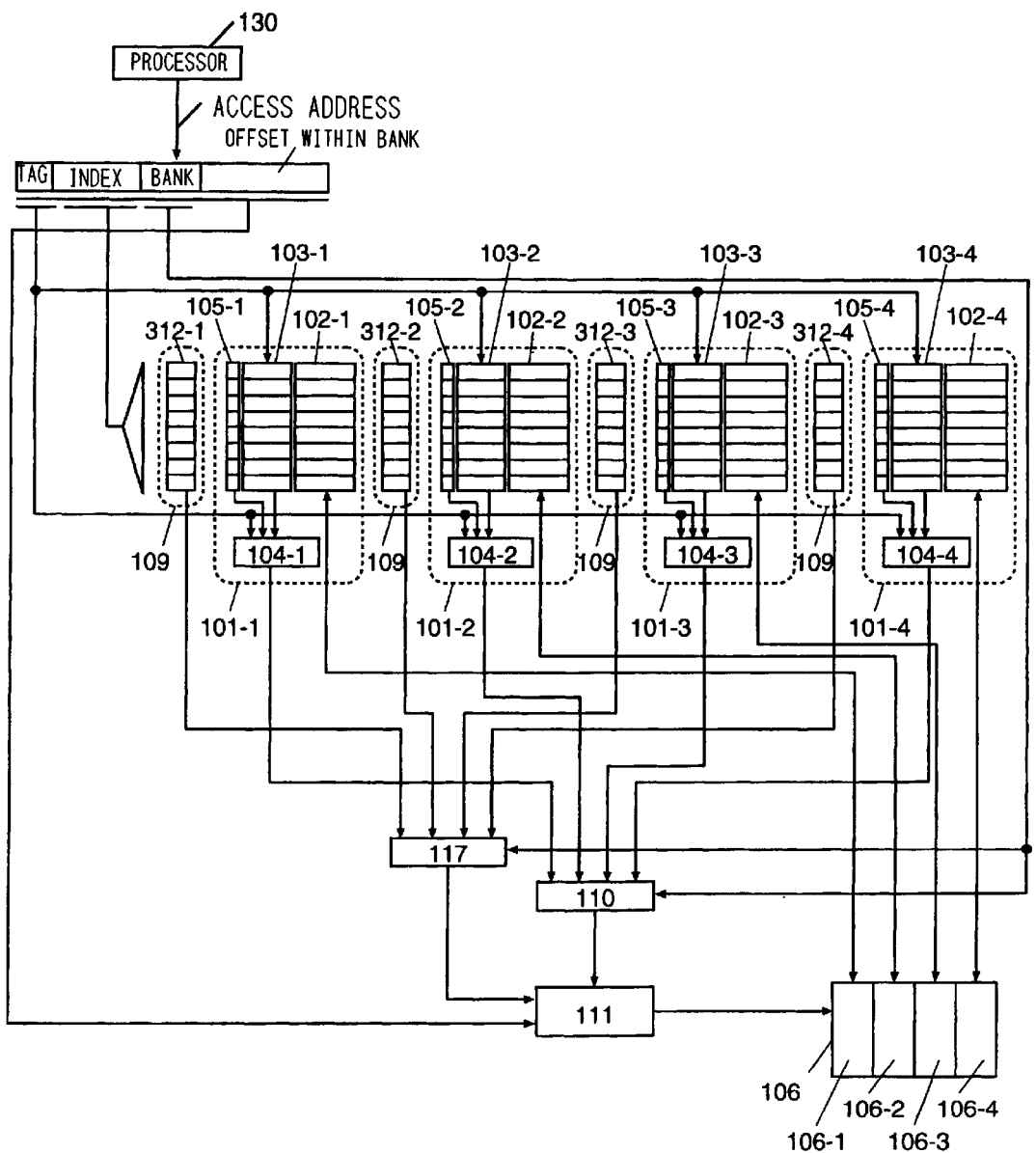
FIG. 5 is a block diagram of a cache memory with variable block-size mechanism in a third embodiment of the invention where block-size is set in each cache line element.

FIG. 5 is a block diagram of a third embodiment of the invention comprising a cache memory with variable block-size mechanism, and a main memory and a processor to be connected to the cache memory.

As shown in FIG. 5, a block-size information storing unit 109 has block-size information tables 312-1~312-4 storing block-size in each cache line element.

Further the third embodiment is different from the second embodiment in that a second multiplexer 117 is provided so as to select block-size of a bank with a cache miss occurred there by bank address, and the selected block-size is inputted to a memory access control circuit 111. Since the third embodiment is similar to the second embodiment in other configuration, the same reference numerals are provided and the description shall be omitted.

The third embodiment is characterized in that block-size set to a cache line element in which a cache miss is occurred is used as size of data transfer at the replace state. Since the block-size is set in each cache line element, the difference of the scope within the spatial locality in the address space can be dealt with finely.

The third embodiment is different from the second embodiment in that block-size being different from each other can be set within the same cache line. During replacing, the block-size set to a block-size information table of a cache bank in which a cache miss is occurred is used, and the block-size stored in other cache line element is not used.

Thus capacity of the block-size information table is increased and the hardware quantity is increased, but since the difference of the scope within the spatial locality in the address space can be dealt with finely, there is effect that the data not necessitating the replacing originally can be prevented from being replaced.

In addition, in the third embodiment shown in FIG. 5, an example is shown where a block-size information table is provided in each cache bank, but the block-size information table may be commonly used in every plural cache banks. Then if the block-size information tables are reduced to one in the number, the third embodiment becomes similar to the second embodiment.

Also in every plural cache lines in any number in the second embodiment, in combination with a method of setting the common block-size, the block-size is commonly used in every plural cache lines in any number in each bank, and the capacity of the block-size information table may be reduced.

Fourth Embodiment

Figure 6:
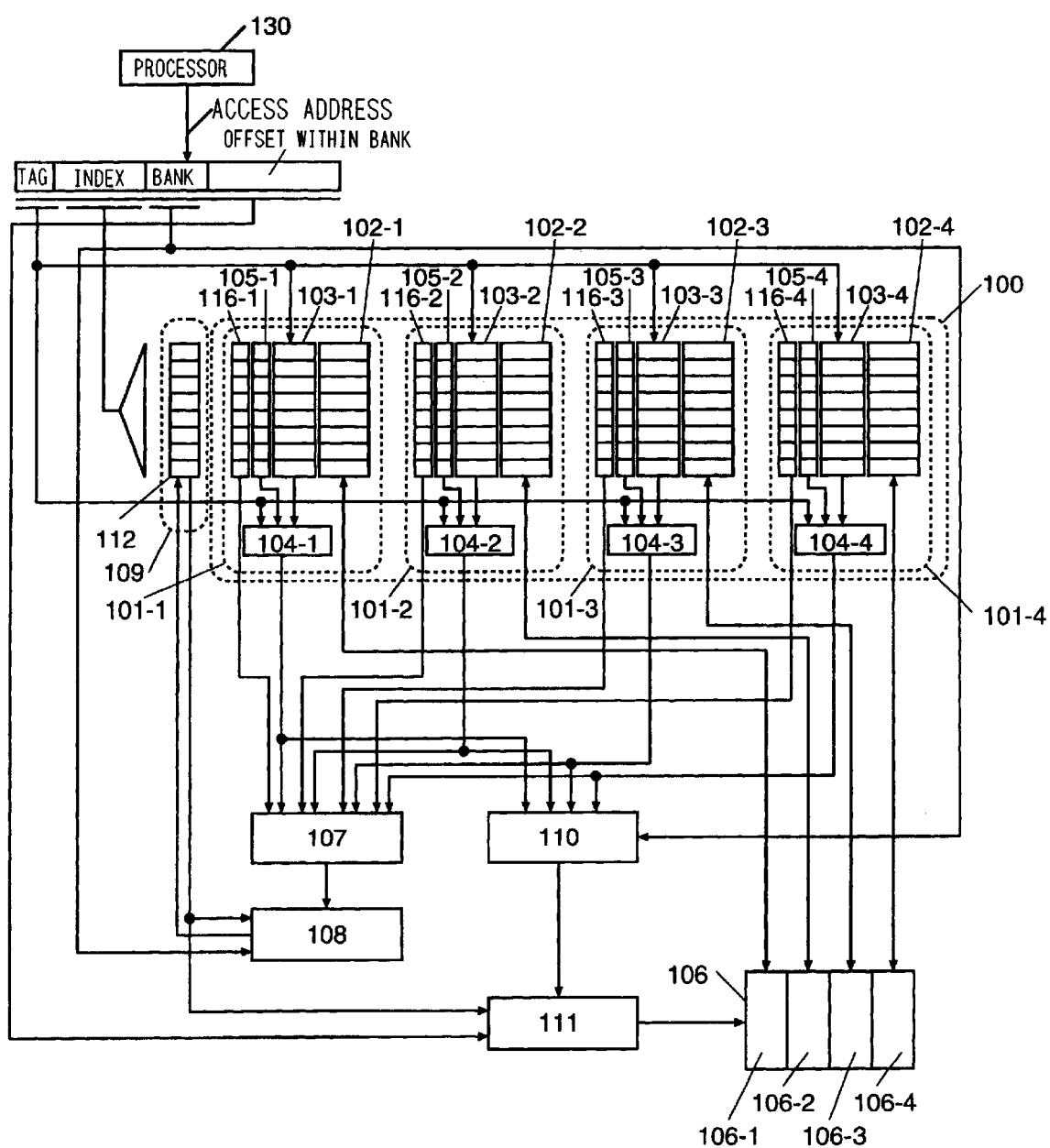
FIG. 6 is a block diagram of a cache memory with variable block-size mechanism in a fourth embodiment of the invention where block-size can be updated in each cache line.

FIG. 6 is a block diagram of a fourth embodiment of the present invention showing whole configuration of a cache memory with variable block-size mechanism, and a main memory to be connected to the cache memory.

As shown in FIG. 6, the fourth embodiment is different from the second embodiment in that access bit arrays 105-1~105-4, a line utility condition judging circuit 107 and a block-size determination circuit 108 are provided. Since the fourth embodiment is similar to the second embodiment in other configuration, the same reference numerals are provided and the description shall be omitted.

The access bit arrays 105-1~105-4 store whether or not the data stored in the individual cache line elements of the data arrays 102-1~102-4 are read respectively in the cache line elements and then are accessed by the processor 130 until now.

The line utility condition judging circuit judges that within the same cache line, among cache line elements other than the cache line element accessed by the processor 130 at present, a cache line element is valid and the data having a tag address equal to the tag address of the master data and is accessed during the period after the data are replaced in until now.

The judging can be effected in that outputs of the comparators 104-1~104-4 and outputs of the access bit arrays 105-1~105-4 are inputted to the line utility condition judging circuit 107, and the logical product is estimated in each cache bank.

Heretofore the data stored by the cache line element accessed by the processor 130 at present are called master data, and among the data judged as accessed after being replaced in until now by the line utility condition judging circuit 107 and stored in the cache line element, the data other than the master data are called sub data.

If the individual data in relation of the master data and the sub data exist within the same cache line, both are already treated as the same block or may be treated as the same block in the future.

Therefore, even if the tag address of the data stored in other cache line element within the same cache line as that of the master data is coincident with the tag address of the master data, if the data are not accessed even once, the data are not judged as the sub data.

The block-size determination circuit 108 judges the cache bank to which the master data by the bank address, and further judges all cache line elements in relation of the master data and the sub data by outputs of the line utility condition judging circuit 107. In concurrence with this, the current block-size of the cache line to which the master data belong, is obtained from the block-size information storing unit 109, and the new block-size of the cache line to which the master data belong, is determined and the block-size information table 112 is updated.

Algorithm of determining the block-size by the block-size determination circuit 108 is as follows.

There are two methods of determining the block-size. In the first method, the block-size is determined based on the total number of the master data and the sub data and the position relation. In the second method, the block-size is determined only by the total number of the master data and the sub data.

In the first method, in addition to the total number of the master data and the sub data, the block-size depending on the position relation between both is determined.

Here, the description will be performed using an example that the bank number of the cache is four, and the three sorts of the block-sizes exist as described in the second embodiment and the addresses are assembled so that the bank address of the bank at the most left side becomes number 0.

First, in the case that the current block-size is small, when the master data and the sub data are stored in the two or more cache line elements continuing from the bank address of even number to the address of upper rank, the block-size is enlarged.

Next, in the case that the current block-size is intermediate, when the total number of the master data and the sub data are four, the block-size is enlarged.

On the other hand, when only the master data exist or the master data and the sub data are not adjacent to each other or the master data and the sub data are continued in the two cache line elements only from the bank address of odd number to the address of upper rank, the block-size is reduced.

Finally, in the case that the current block-size is large, when the total number of the master data and the sub data is two or less, the block-size is reduced.

In the individual block-sizes, if the condition is not relevant, the block-size is not varied.

Thus the block-size can be set suitably using the total number of the master data and the sub data together with the position relation between both.

Here, besides the above-mentioned example to explain the first method, the total number of the master data and the sub data being the threshold value determining whether or not the block-size is to be varied and the position relation of the individual data are changed thereby the condition of updating the block-size can be suitably changed.

In the second method, if the total number of the master data and the sub data is larger than the predetermined number, the block-size is enlarged, on the other hand, if the total number is smaller than the predetermined number, the block-size is reduced.

Here, the description will be performed using an example that the bank number of the cache is four, and the three sorts of the block-sizes exist as described in the second embodiment.

First, in the case that the current block-size is small, when the total number of the master data and the sub data is two or more, the block-size is enlarged.

Next, in the case that the current block-size is intermediate, when the total number of the master data and the sub data is four, the block-size is enlarged, and when only the master data exist, the block-size is reduced.

Finally, in the case that the current block-size is large, when the total number of the master data and the sub data is two or less, the block-size is reduced.

In the individual block-sizes, if the condition is not relevant, the block-size is not varied.

Thus the block-size can be determined simply using the total number of the master data and the sub data only.

Here, besides the above-mentioned example to explain the second method, the total number of the master data and the sub data being the threshold value determining whether the block-size is to be varied or not is changed thereby the condition of updating the block-size can be suitably changed.

Further in the first or second method, irrespective of increase or decrease of the number of the cache banks, the total number of the master data and the sub data being the threshold value and the position relation of those are set suitably thereby the block-size can be varied.

Also in the first or second method, irrespective of increase or decrease of the number of the cache banks, the total number of the master data and the sub data being the threshold value and the position relation of those are set suitably thereby the sort of the block-size can be changed.

Further there are two or more methods regarding whether or not the block is to be varied stepwise. In the third method, new block-size is determined based on the current block-size of the master data. In the fourth method, new block-size is determined irrespective of the current block-size of the master data.

Here, the description will be performed using an example that the bank number of the cache is four, and the three sorts of the block-sizes exist as described in the second embodiment.

In the third method, the block-size is updated stepwise from large size to intermediate size or from intermediate size to small size, but is not varied discontinuously such as from large size to small size.

Then such state can be prevented that data being significantly different in the scope within the spatial locality are rarely accessed thereby the block-size is abruptly varied. Also the cycle number required for the replacement is averaged, and the processing performance of the processor can be stabilized.

On the other hand, in the fourth method, since new processor size is determined irrespective of the current block-size, variation from small size to large size or from large size to small size may be produced.

Since the current block-size is not used, new block-size can be simply determined.

Here in the third or fourth method, irrespective of increase or decrease of the number of the block-size, any method of updating the block-size may be adopted.

The first method or the second method and the third method or the fourth method are combined arbitrarily, there are four types of algorithm to determine the block-size.

As the time for the block-size determination circuit 108 to update the block-size, there may be the time of referring all memories, only the time of referring the hit to the cache, only the time of referring the miss hit to the cache or the like.

Further to these four types of algorithm, the decision whether or not the reference history in the past is utilized in the updating of the block-size may be combined. The utilization of the reference history in the past means that generating times of the events to provide chance of updating the block-size are summed up, and when the summed value becomes the predetermined value, the block-size is updated.

For example, each of the individual fields storing the block-size of the block-size information table 112 is provided with a counter making the initial value 0. When the block-size determination circuit 108 judges that the block-size of any field is enlarged, the counter is incremented, and when the block-size determination circuit 108 judges that the block-size of any field is reduced, the counter is discriminated. Thus when the value of the counter is over the predetermined value, the block-size of the cache element is enlarged, and when the value of the counter is below the predetermined value, the block-size is reduced.

In such arrangement, effect of suppressing the abrupt variation of the block-size due to performing the rare processing such as the exception processing becomes high.

Here, at the cold start time or the like immediately after the reset, as the block-size when the data are replaced in to the cache memory for the first time, the predetermined block-size may be used.

Thus the block-size storing in the block-size information table 112 during the execution of the program is updated at any time, thereby the variation of the scope within the spatial locality varying attendant on the lapse of time can be dealt with, and generating of the unnecessary replacing can be suppressed.

Here, in the example explaining the fourth embodiment, although the block-size information storing unit 109 has the block-size information table 112 storing the block-size in each cache line, similar effect is obtained also when the block-size is set commonly to every plural cache lines in any number.

Figure 7:
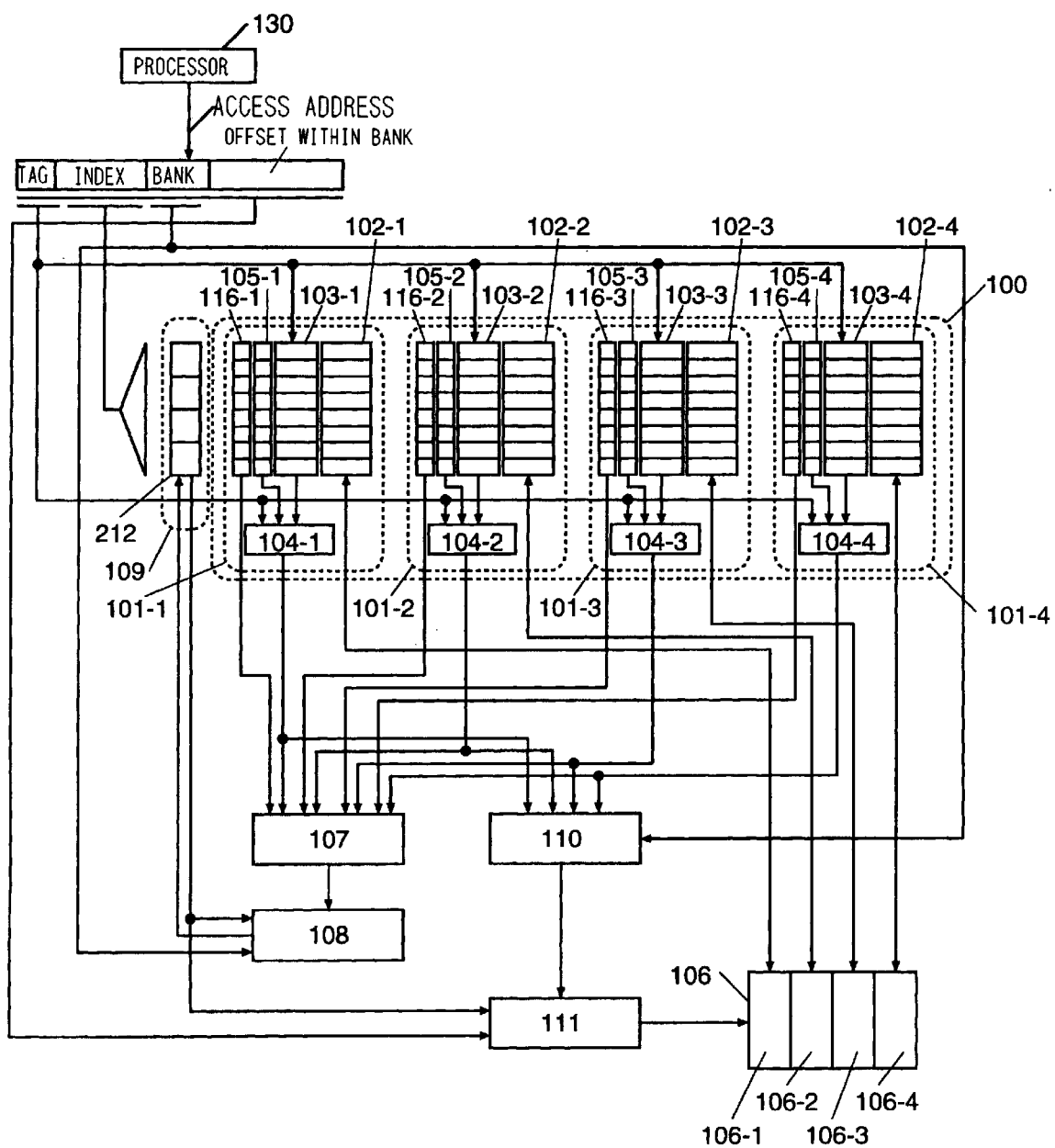
FIG. 7 is a block diagram of a cache memory with variable block-size mechanism in the invention showing a modification that block-size is set in every plural cache lines based on the fourth embodiment.

FIG. 7 shows an example having a block-size information table 212 having the block-size commonly to every two cache lines.

When the block-size is commonly used between the cache lines in such manner, since the granularity of the setting becomes large, it is difficult that the difference of the scope within the spatial locality in the address space is dealt with finely, but since the capacity of the block-size information table may be small, there is effect of reducing the hardware quantity.

In the description of the fourth embodiment, although a specific example is mentioned, the embodiment is not limited to this but following examples may be used.

(1) In addition to a case that the above-mentioned cache memory system adopts direct map system, also in a case of adopting set associative system, block-size set to each field of the block-size information table 112 is commonly used between ways thereby a cache memory system with variable block-size of data can be realized.

(2) In addition to an example where the word length of the cache line element is 32 bytes as above described, the word length to be allocated to an offset within the bank is varied even in the case of different size thereby a cache memory system with variable block-size of data in the present invention can be realized.

(3) In addition to an example where the cache memory is constituted by four banks as above described, the word length to be allocated to the bank address is varied even in case of the bank number being different thereby a cache memory system with variable block-size of data in the present invention can be realized.

(4) In addition to the case that sort of the block-size is three as above described, also in the case that sort of the block-size is other than three, the combination of the cache line elements being an object of replacing is changed, and further in the case that sort of the block-size is three, the combination of the cache line elements being an object of replacing is changed, thereby a cache memory system with variable block-size of data in the present invention can be realized.

(5) In addition to an example where the individual data banks of the cache memory 100 are connected to the individual memory banks of the main memory 106 directly by the data bus respectively as above described, also in the case that width of the data bus connecting between the cache memory 100 and the main memory 106 is narrower than that of the above-mentioned example, a multiplexer and a demultiplexer are installed at an interface of the data bus thereby a cache memory system with variable block-size of data in the present invention can be realized.

(6) In addition to an example where the bank number is equal in the main memory and the cache memory as above described, even if the bank number is different from each other, the data line is multiplexed or demultiplexed thereby a cache memory system with variable block-size of data in the present invention can be realized.

(7) In addition to the case that the block-size information storing unit 109 has the block-size information table 112 storing the block-size in each cache line as above described, even when the common block-size is set in every plural cache lines of any number, a cache memory system with variable block-size of data in the present invention can be realized. FIG. 4 shows an example where a block-size information table 212 has the block-size commonly in every two cache lines. When the block-size is used commonly between cache lines in such manner, since the granularity of setting becomes large, the difference of the scope within the spatial locality in the address space can not be dealt with finely, but since the capacity of the block-size information table may be small, there is effect that the hardware quantity can be reduced.

Fifth Embodiment

Figure 8:
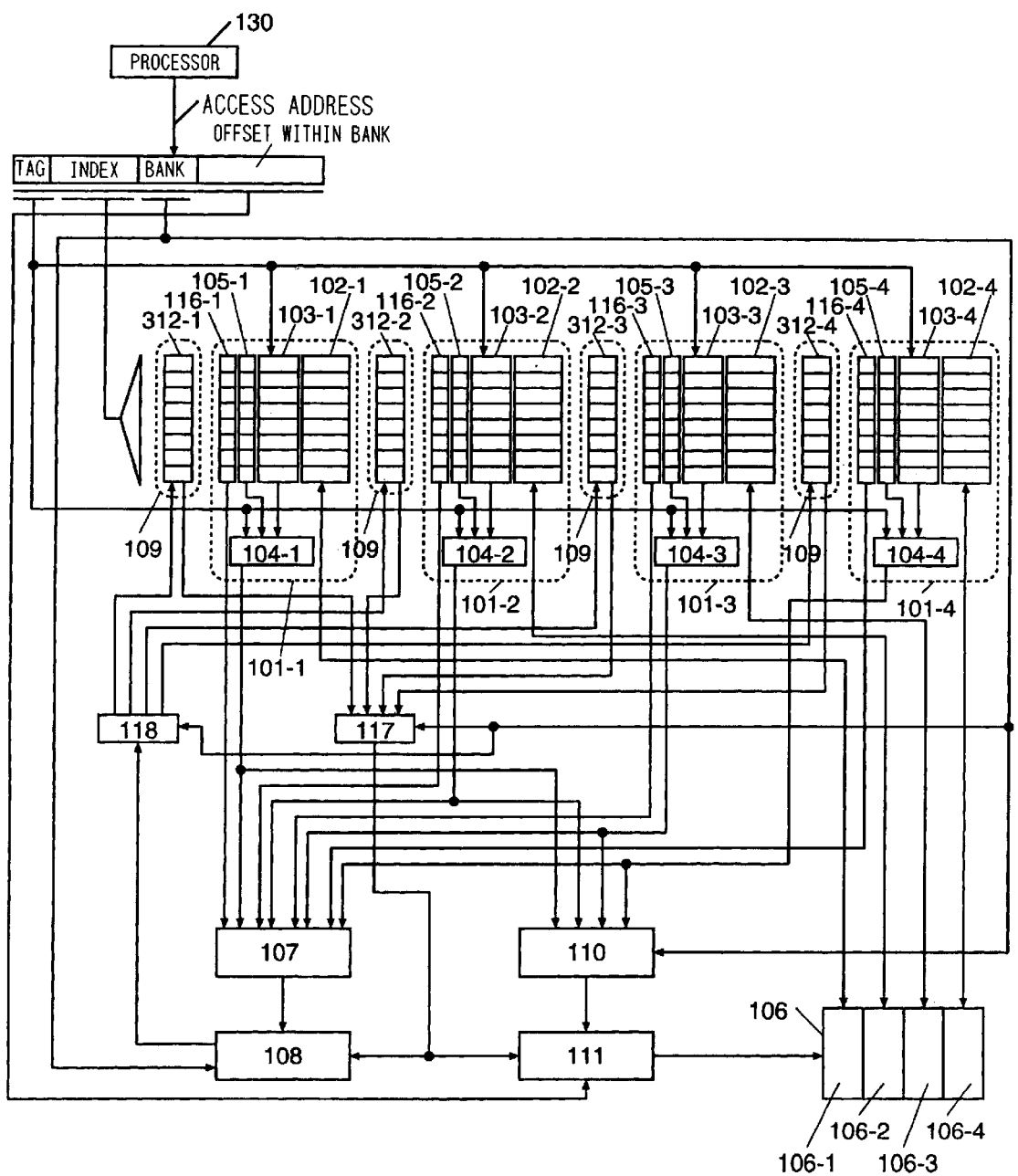
FIG. 8 is a block diagram of a cache memory with variable block-size mechanism in a fifth embodiment of the invention where block-size can be updated in each cache line element.

FIG. 8 is a block diagram of a fifth embodiment of the invention comprising a cache memory with variable block-size, and a main memory and a processor to be connected to the cache memory.

As shown in FIG. 8, a block-size information storing unit 109 has block-size information tables 312-1~312-4 storing block-size in each cache line element.

Further the fifth embodiment is different from the fourth embodiment in that a second multiplexer 117 is provided so as to select block-size of a bank in which a cache miss is occurred by bank address, and a demultiplexer is provided so as to select block-size information tables 312-1~312-4 to be updated by bank address.

Since the fifth embodiment is similar to the fourth embodiment in other configuration, the same reference numerals are provided and the description shall be omitted.

The fifth embodiment is characterized in similar manner to the third embodiment in that block-size set to a cache line element in which a cache miss is occurred is used as size of data transfer at the replace state. Since the block-size is set in each cache line element, the difference of the scope within the spatial locality in the address space can be dealt with finely.

The fifth embodiment in similar manner to the third embodiment is different from the fourth embodiment in that block-size being different from each other can be set within the same cache line. During replacing, the block-size set to a block-size information table of a cache bank in which a cache miss is occurred is used, and the block-size stored in other cache line element is not used.

Since the block-size is set in each cache line element, capacity of the block-size information table is increased and the hardware quantity is increased, but since the difference of the scope within the spatial locality in the address space can be dealt with finely, there is effect that the data not necessitating the replacing originally can be prevented from being replaced.

In addition, in the fifth embodiment shown in FIG. 8, an example is shown where a block-size information table is provided in each bank, but the block-size information table may be commonly used in every plural cache banks. Then if the block-size information tables are reduced to one in the number, the fifth embodiment becomes similar to the fourth embodiment.

Also in every plural cache lines in any number in the fourth embodiment, in combination with a method of setting the common block-size, the block-size is commonly used in every plural cache lines in any number in each bank, and the capacity of the block-size information table may be reduced.

Sixth Embodiment

Figure 9:
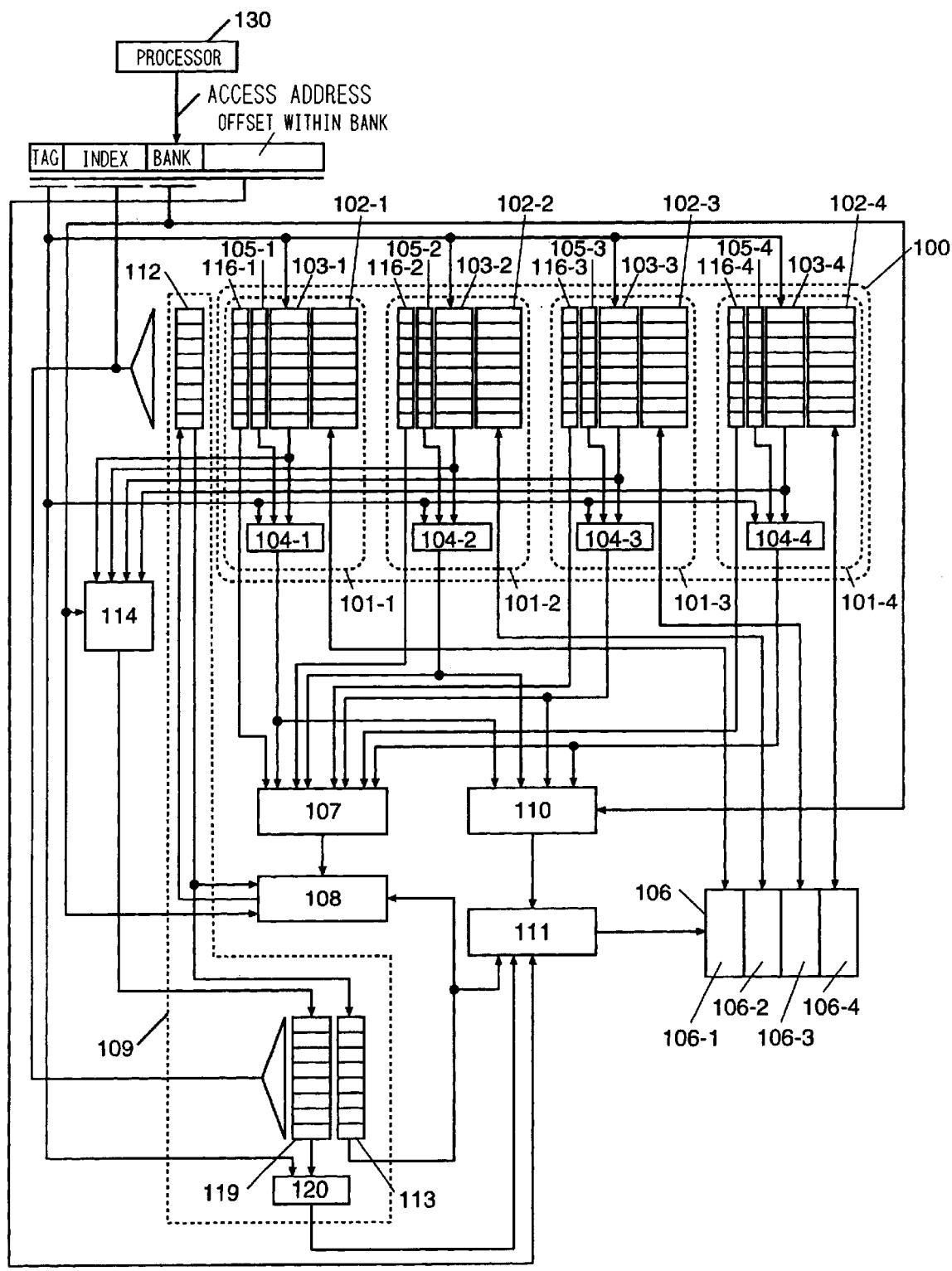
FIG. 9 is a block diagram of a cache memory with variable block-size mechanism in a sixth embodiment of the invention where means for storing block-size of data replaced out from a cache memory to a main memory is provided based on the fourth embodiment, and when the data are replaced in, the processing is performed according to the block-size.

FIG. 9 is a block diagram of a sixth embodiment of the invention showing whole configuration of a cache memory with variable block-size mechanism, and a main memory to be connected to the cache memory.

The sixth embodiment is basically similar to the fourth embodiment shown in FIG. 6, but is different from the fourth embodiment in that a block size information storing unit 109 is provided with a history table 113 storing block size in each cache line, a second tag array 119 storing a tag address of the cache line corresponding to the block size stored in the history table 113, and a second comparator 120 comparing the tag address within the access address and output of the second tag array 119, further a tag selection circuit 114 is provided for selecting the tag address inputted to the second tag array 119 by the bank address within the access address, and when the data are replaced out to the main memory, the whole cache line becomes an object of the replacing-out. Since the sixth embodiment is similar to the fourth embodiment shown in FIG. 6 in other configuration, the same reference numerals are provided and the description shall be omitted.

In the sixth embodiment, when the data are replaced out to the main memory, the tag address of the cache bank selected by the tag selection circuit 114 is stored in the second array 119, and the block size of the data to be replaced out to the main memory is stored in the history table 113.

When the data are to be replaced in from the main memory to the cache memory, it is investigated whether or not the block size of the data stored in the history table 113 at the state for the data to be replaced out from the cache memory to the main memory in the past is still stored in the history table 113 also in the present.

This investigation is realized in a method similar to the method of retrieving the data stored in the cache memory using index address and tag address in access address. That is, the history table 113 and the second tag array are retrieved by the index address in the access address, and when the tag address in the access address and the tag address outputted by the second tag array are coincident, it is judged that the block size of the data is stored in the history table. When the block size of the data is stored in the history table 113, the memory access control circuit 111 replaces in to the data in the block size. When the block size of the data is not stored in the history table, data of the memory line indicating the data are replaced in to the cache memory in the predetermined block size.

Figure 10:
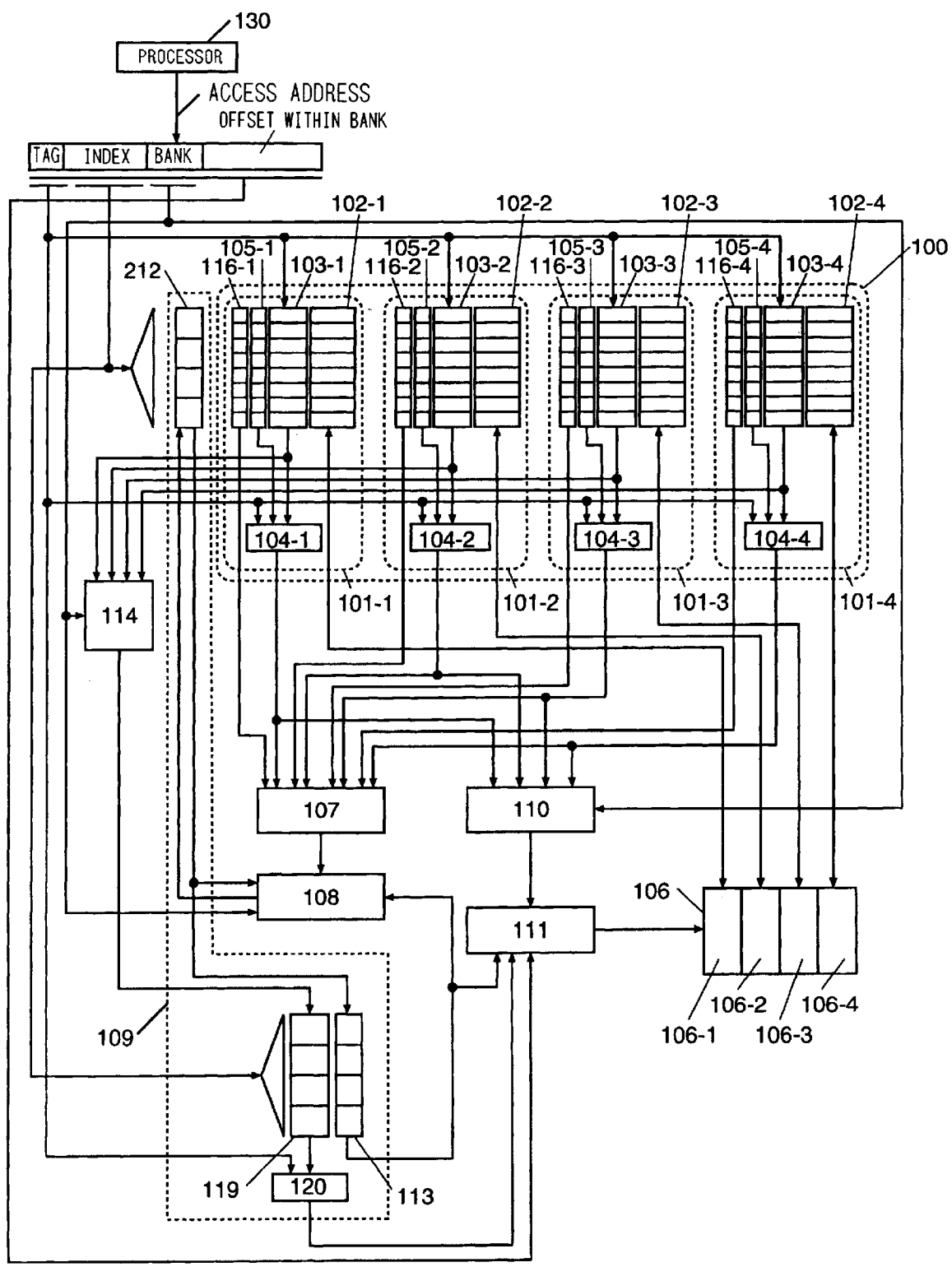
FIG. 10 is a block diagram of a cache memory with variable block-size mechanism in the invention showing a modification that block-size can be updated in every plural cache lines based on the sixth embodiment.

In the example explaining the sixth embodiment, although the block size information storing unit 109 has the block size information table 112 storing the block size in each cache line, similar effect can be obtained also when common block size is set in every plural cache lines in any number. FIG. 10 shows an example having a block size information table 212 in every two cache lines using the block size commonly.

Since the block size is used commonly between the cache lines, the granularity of the selection becomes large and it is difficult that the difference of the scope within the spatial locality in the address space is dealt with finely, but since the capacity of the block size information table may be small, there is effect of reducing the hardware quantity.

As above described, according to the present invention, effects are obtained as follows.

(1) According to the first embodiment to solve the first problem, means for setting block size of data replaced between a cache memory and a main memory is provided in any storage space within the cache memory, thereby the difference of the scope within the spatial locality in the address space can be dealt with and the block size can be set, and the generating of the unnecessary replacing can be suppressed.

(2) Particularly, according to the second or third embodiment, means for setting block size of data replaced between a cache memory and a main memory is provided in any storage space within the cache memory, and the block size in each storage space analyzed before the execution of the program is set, thereby the difference of the scope within the spatial locality in the address space can be dealt with and the block size can be set.

(3) According to the fourth, fifth or sixth embodiment to solve the second problem, means for setting block size of data replaced between a cache memory and a main memory is provided in any storage space within the cache memory, and means for determining the block size set to the means for setting the block size for the data stored in the cache memory based on the history referred by the processor is provided, and the block size is updated at any time thereby the variation of the scope within the spatial locality attendant on the execution of the program can be dealt with.

What is claimed is:

1. A cache memory system wherein a cache memory is provided for temporarily storing data stored in a main memory, and a processor accesses said cache memory, said cache memory system comprising:

a block-size information storing means for storing respective sizes of the data to be replaced between the cache memory and the main memory in every storage space of respective predetermined amounts within the cache memory;

means for replacing the data between the storage space in which a cache miss occurs within the cache memory and the main memory, when access of the processor to the storage space within the cache memory raises the cache miss, at the block-size corresponding to the storage space in which the cache miss occurs, among the size stored in the block-size information storing means;

the processor outputting an access address with individual fields of tag address, index address, bank address and an offset within the bank;

the cache memory including at least two cache banks, and each of the cache banks having a data array constituted by an aggregate of elements storing the data in a word number assigned by an offset within the bank, a valid flag array constituted by an aggregate of valid flags storing whether or not the data stored in the individual elements of the data array are valid, and a tag array storing the individual tag addresses of the data stored in the individual elements of the data arrays;

the data array, the valid flag array and the tag array respectively outputting the data of the elements assigned by the index address, values of the valid flags of the data, and the tag address of the data;

each of the cache banks being provided with a comparator for comparing the tag address outputted by the tag array and the tag address within the access address and indicating the comparison result, when the value of the valid flag indicates the storing of the data valid to the element;

a first multiplexer for selecting and outputting the comparison result of the cache bank assigned by the bank address;

the block-size information storing means referring the size in each of the storage spaces within the cache memory at the index address; and a memory access control circuit performing control of replacing the data between the cache memory and the main memory, wherein when the processor outputs the access address, the memory access control circuit judges whether or not the cache miss is raised by the output of the first multiplexer, and when the cache miss occurs, the memory access control circuit replaces the data between the storage space in which the cache miss occurs and the main memory space assigned by the access address, at the block-size corresponding to the storage space in which the cache miss occurs, among the size stored in the block-size information storing means.

2. A cache memory system wherein a cache memory is provided for temporarily storing data stored in a main memory, and a processor accesses said cache memory, said cache memory system comprising:

a block-size information storing means for storing respective sizes of the data to be replaced between the cache memory and the main memory in every storage space of respective predetermined amounts within the cache memory;

means for replacing the data between the storage space in which a cache miss occurs within the cache memory and the main memory, when access of the processor to the storage space within the cache memory raises the cache miss, at the block-size corresponding to the storage space in which the cache miss occurs, among the size stored in the block-size information storing means;

the processor outputting an access address with individual fields of tag address, index address, bank address and an offset within the bank;

the cache memory including at least two cache banks, and each of the cache banks having a data array constituted by an aggregate of elements storing the data in the word number assigned by an offset within the bank, a valid flag array constituted by an aggregate of valid flags storing whether or not the data stored in the individual elements of the data array are valid, a tag array storing the individual tag address of the data stored in the individual elements of the data arrays, and an access bit array constituted by an aggregate of access bits storing whether or not the individual data stored in the individual data arrays are referred by the processor, after the data are read in the elements respectively until now;

the data array, the valid flag array, the tag array and the access bit array respectively outputting the data of the elements assigned by the index address, values of the valid flags of the data, the tag addresses of the data, and values of the access bits of the data;

each of the cache banks being provided with a comparator for comparing the tag address outputted by the tag array and the tag address within the access address and outputting the comparison result, when the value of the valid flag indicates the storing of the data valid to the element;

a first multiplexer for selecting and outputting the comparison result of the comparator of the cache bank assigned by the bank address;

a block-size information storing means for outputting the size in each storage space within the cache memory assigned by the index address;

a line utility condition judging circuit for outputting a signal indicating the cache bank, if the comparison results outputted by the comparators of all cache banks and the values outputted by the access bits of all cache banks are inputted, and when the comparison results and values of the outputted access bits indicate the referring by the processor are coincident;

a block-size determination circuit for determining a new size of the storage space, if the size of the storage space within the cache memory assigned by the index address, the bank address and the output of the line utility condition judging circuit are outputted to the block-size determination circuit;

a memory access control circuit performing control of replacing the data between the cache memory and the main memory;

wherein when the processor outputs the access address, the memory access control circuit judges whether or not the cache miss occurs by the output of the first multiplexer, when the cache miss occurs, the memory access control circuit replaces the data between the storage space in which the cache miss occurs and the main memory space assigned by the access address, at the block-size corresponding to the storage space in which the cache miss occurs, among the sizes stored in the block-size information storing means, and the block-size determination circuit updates the size stored in the block-size information storing means.

3. A cache memory system as set forth in claim 1 or claim 2, further comprising a second multiplexer for storing the size in each element within the cache memory and selecting and outputting the size of the cache bank assigned by the bank address in said block size information storing means, and wherein when the cache miss occurs, the memory access control circuit replaces the data between the space in which the cache miss occurs and the main memory assigned by the access address, at the size outputted by the second multiplexer.

4. A cache memory system as set forth in claim 1 or claim 2, further comprising: a second tag array storing the tag address of the data returned to the main memory; and a table storing the size is said block size information storing means; and a tag selection circuit;

wherein when the second tag array and the table are referred in the index address, the size and the tag address are outputted, and a second comparator is provided for comparing the tag address outputted by the table and the tag address within the access address and outputting the comparison result, said tag selection circuit is provided for selecting the tag address to be inputted to the table from outputs of the tag arrays of all cache banks by the bank address, when the cache miss occurs, if the comparison result of the tag address of the access address by the second comparator and the tag address outputted by the second array are coincident, the data returned to the main memory are read into the cache memory again, at the size stored in the table assigned by the index address, and the tag address selected in the tag selection circuit and the size assigned by the index address in which the cache miss occurs and corresponding to the storage space within the cache memory are stored respectively in the second tag array and the table.

* * * * *